(12) United States Patent
Boubez et al.

(10) Patent No.: US 9,130,897 B2
(45) Date of Patent: *Sep. 8, 2015

(54) SYSTEM AND METHOD FOR SECURING WEB SERVICES

(71) Applicant: CA, INC., Islandia, NY (US)

(72) Inventors: Toufic Boubez, Vancouver (CA); Scott Morrison, New Westminster (CA); Dimitri Sirota, Vancouver (CA); Francois Lascelles, Kelowna (CA)

(73) Assignee: CA, INC., New York, NY (US)

(*) Notice: Subject to any disclaimer, the term of this patent is extended or adjusted under 35 U.S.C. 154(b) by 33 days.

This patent is subject to a terminal disclaimer.

(21) Appl. No.: 13/901,489

(22) Filed: May 23, 2013

(65) Prior Publication Data

US 2014/0351316 A1 Nov. 27, 2014

Related U.S. Application Data

(63) Continuation of application No. 10/952,787, filed on Sep. 30, 2004, now abandoned.

(60) Provisional application No. 60/506,759, filed on Sep. 30, 2003.

(51) Int. Cl.
*H04L 12/24* (2006.01)
*H04L 29/06* (2006.01)

(52) U.S. Cl.
CPC .............. *H04L 63/00* (2013.01); *H04L 63/08* (2013.01); *H04L 63/10* (2013.01); *H04L 63/168* (2013.01)

(58) Field of Classification Search
CPC ........ H04L 63/08; H04L 63/10; H04L 63/168
USPC ................ 709/203, 218, 223, 225, 230, 318; 726/4, 7, 9; 713/170
See application file for complete search history.

(56) References Cited

U.S. PATENT DOCUMENTS 6,484,261 B1    11/2002    Wiegel
6,662,235 B1 * 12/2003    Callis et al. .................... 719/318

(Continued)

FOREIGN PATENT DOCUMENTS

WO      WO03091895      11/2003

OTHER PUBLICATIONS

Box et al., "Web Services Policy Framework (WS-Policy)", version 1.01, Jun. 2, 2003.*

(Continued)

*Primary Examiner* — Kambiz Zand
*Assistant Examiner* — Noura Zoubair
(74) *Attorney, Agent, or Firm* — Vierra Magen Marcus LLP

(57) ABSTRACT

A method and system for securing web services on one or more server computers by one or more client computers, the computers connected to one or more networks through one or more network interfaces, each computer having one or more memories and one or more central processing units (CPUs), the system including one or more logical expressions that define constraints on one or more service releases; a gateway process receiving service request messages from one or more of the clients for i) identifying the service request message, ii) processing the service request message in accordance with one or more of the logical expressions associated with the requested service and iii) providing access to the requested service if the constraints are satisfied.

12 Claims, 6 Drawing Sheets

(56) References Cited

U.S. PATENT DOCUMENTS

2003/0182364 A1    9/2003  Large
2004/0128506 A1*   7/2004  Blakley et al. ................ 713/170
2006/0041636 A1    2/2006  Ballinger

OTHER PUBLICATIONS

Response to Canadian Office Action dated Sep. 5, 2014, Canadian Patent Application No. 2,521,563.
Response to Canadian Office Action dated Jul. 8, 2014, Canadian Patent Application No. 2,483,233.
Canadian Office Action dated Feb. 11, 2013, Canadian Patent Application No. 2,521,563.
Response to Canadian Office Action dated Aug. 12, 2013, Canadian Patent Application No. 2,521,563.
Canadian Office Action dated Feb. 13, 2013, Canadian Patent Application No. 2,483,233.
Response to Canadian Office Action dated Aug. 8, 2013, Canadian Patent Application No. 2,483,233.
Canadian Office Action dated May 5, 2014, Canadian Patent Application No. 2,521,563.
Canadian Office Action dated Jan. 8, 2014, Canadian Patent Application No. 2,483,233.
Office Action dated Dec. 22, 2014, U.S. Appl. No. 13/855,595.
Response Office Action dated Mar. 23, 2015, U.S. Appl. No. 13/855,595.
Notice of Allowance dated Apr. 29, 2015, U.S. Appl. No. 13/855,595.
Response to Office Action dated May 14, 2015, Canadian Patent Application No. 2,521,563.

* cited by examiner

SYSTEM AND METHOD FOR SECURING WEB SERVICES

CROSS-REFERENCE TO RELATED APPLICATIONS

This application claims the benefit of U.S. Provisional Application No. 60/506,759, filed Sep. 30, 2003.

FIELD OF THE INVENTION

The invention relates to the field of distributed computing in a client-server environment, and more particularly to a system and method for efficiently securing Web services.

BACKGROUND OF THE INVENTION

Web Services

The term Web services is commonly used in reference to a modular collection of web-protocol based software applications that can be mixed and matched to provide business functionality through an internet connection.

With Web Services, information sources become components that you can use, re-use, mix, and match to enhance Internet and intranet applications ranging from a simple currency converter, stock quotes, or dictionary to an integrated, portal based travel planner, procurement workflow system, or consolidated purchase processes across multiple sites. Each is built upon an architecture that can be illustrated as a stack of layers as shown in FIG. 1.

Each vendor, standards organization, or marketing research firm defines Web Services in a slightly different way. Gartner, for instance, defines Web Services as "loosely coupled software components that interact with one another dynamically via standard Internet technologies." Forrester Research takes a more open approach to Web Services as "automated connections between people, systems and applications that expose elements of business functionality as a software service and create new business value."

Although there are a variety of Web Services architectures, Web Services, at a basic level, can be considered a universal client-server architecture that allows disparate systems to communicate with each other without using proprietary client libraries.

An advantage of the Web services architecture is that it simplifies the development process typically associated with client/server applications by effectively eliminating code dependencies between client and server and the server interface information is disclosed to the client via a configuration file encoded in a standard format Doing so allows the server to publish a single file for all target client platforms.

Unfortunately deployment of Web services is hampered by the problem of providing secured access to these services, and describing policies governing how Web services and their client applications interact.

Current security implementations and mechanisms introduce brittleness and tight coupling between the client applications and the Web service, leading to solutions that are not easily reusable, or that require expensive re-development when security policies or agreements change. Furthermore, current platform vendors have not considered how both sides of Web services transactions (provider and consumer) should be coordinated.

Service Oriented Architecture (SOA)

To support these Web-Services in the Internet, a new architecture was defined, SOA, the Service Oriented Architecture. This new architecture describes how Web-Services may be found by users, how a potential user can access such Web-Services, and a language describing the interfaces to these services.

The communication protocol for these Web-Services is also defined by a new protocol, called Simple Object Access Protocol (SOAP).

SOAP is a way for a program running in one kind of operating system to communicate with a program in the same or another kind of an operating system by using preferably the World Wide Web's Hypertext Transfer Protocol (HTTP) and its eXtensible Markup Language (XML) as the mechanisms for information exchange. Since Web protocols are installed and available for use by all major operating system platforms, HTTP and XML provide an already available solution to the problem of how programs running under different operating systems in a network can communicate with each other.

SOAP specifies exactly how to encode an HTTP header and an XML file so that a program in one computer can call a program in another computer and pass it information. It also specifies how the called program can return a response.

One of the main principles of an SOA is the concept of loose coupling. In a loosely coupled system, connections and interactions between various components are flexible enough so that changes in the interface of one component will not lead to a breakdown of another component. In order to enable loose coupling, three main Web services standards have evolved, all based on the fundamental XML standard. Each of these three standards are illustrated as a stack of layers in FIG. 1 and are:

SOAP. As mentioned above SOAP is XML based messaging standard, defining an envelope element as a container for a header element and a body element, in a request-response interaction model. Using XML on the wire for messaging hides technology choices from both ends of the conversation.

WSDL (Web Services Description Language). An XML based Interface Definition Language (IDL) similar to other IDLs defined for example in the CORBA architecture. A WSDL document described the functional aspects of a service, such as the format of the input and output messages, and the URL to which the SOAP request should be sent to invoke the service.

UDDI (Universal Description, Discovery and Integration). An XML and SOAP based API specifications for service description publication and discovery. A UDDI server acts as a registry for Web services, and provides a mechanism to locate services and retrieve their interfaces.

While the platform and tools vendors have made available a variety of technologies to handle the layers in the Web services stack (such as SOAP and WSDL toolkits and UDDI implementations), the bulk of the effort has been directed to the provisioning, of the various Web services, with the creation of deployment environments and management tools.

Unfortunately, deployment of Web services is hampered by the problem of providing secured access to these services, and describing policies governing how Web services and their client applications interact.

For example, current security implementations and mechanisms introduce brittleness and tight coupling between the client applications and the Web service, leading to solutions that are not easily reusable, or that require expensive re-development when security policies or agreements change. Furthermore, current platform vendors have not considered how both sides of Web services transactions (provider and consumer) should be coordinated.

Current technologies address security issues, by providing two kinds of solutions, both geared mainly to Web service providers. These include tools for developers, making security a software development problem and static firewall solutions that perpetuate the brittleness of tight coupling between systems. Very little has been done to address the more practical, real-world, aspects of securing, coordinating and customizing Web services in a dynamically at run-time, especially in an environment where typically a Web service will have multiple consumers with varying security requirements and policies.

Technologies integrating all layers of the Web services stack (including SOAP, WSDL and UDDI) for both service provider and consumer are missing. This lack of solutions makes it difficult for many organizations to justify a full and public adoption of Web services technology, regardless of its eventual promise.

Tight Binding of Services to Requester

In FIG. 2, there is shown schematically, the roles and sequence of events in an SOA. A Service Provider publishes a description of its service to a Services Broker, typically a UDDI server or node which operates as a repository. This service description also typically includes a WSDL document. Before the client can request the service it need to find the provider. Upon request, the service broker (UDDI node) returns a document that allows the client to locate the particular providers interface then bind to the provider. It then invokes the service through the bindings described in the interface. All interactions between the three entities are typically SOAP requests.

One of the limitations of this architecture occurs when issues of security and policy are involved. In typical real world scenarios, services that are provided between business entities, whether within the departments of a particular organization, or between business partners, are not anonymous. Instead, they are governed with sometimes strict security policies and maybe even different usage and Quality of Service (QoS) policies and agreements.

Despite recent advances in tools and infrastructure, the state-of-the-art in Web services security remains laborious and prone to error. Security best practices are ill defined. What little implementation exists is littered throughout the Web services stack, appearing in the transport layer, at the application server, and in every individual Web service protocol and implementation. This creates a number of vulnerabilities and multiple points of failure that conspire to complicate the developer's and the administrator's jobs. Once an administrator deploys a service, security becomes instantly entrenched and difficult to manage. Any change an organization makes to its security policy, any alteration made to signatures, encryption, or even server location, seems to necessitate a costly new development effort, both on the server side and on the client side. These issues combine to make solutions that are simply not reusable.

Implementing security policies into the code of the Web service is undesirable for many reasons. Web service and XML security is a complex matter and very error prone, especially for non-expert developers, and will add a large amount of time and expense to any Web services deployment project; policies can and will change over time, leading to more time and expense and possibility of error any time the code base has to be modified; and finally, as partners are added or removed, or their individual policies are modified, the Web service code, with the security code embedded in it, will become extremely difficult, if not impossible, to manage.

But even if all those obstacle were surmountable, a major issue remains: by implementing complex, but necessary, policies on the Web service side, the burden of implementing your security is placed on the client application. This is a very serious responsibility, and in many cases consumers of the Web service are not up to the challenge of implementing the required security. More importantly, however, any change in policies on service side will need to be mirrored on the client side, in order for the system to remain operational.

There remains a need for a solution that both manages and coordinates security, end-to-end across a Web Services integration lifecycle and which is a centrally administrable, standards-based solution that restores fine-grained security control and visibility to IT managers at the Web services application layer.

SUMMARY OF THE INVENTION

A general aspect of the present invention comprises a system for enforcing policies on access to Web services on one or more server computers by one or more client computers, the computers connected to one or more networks through one or more network interfaces, each computer having one or more memories and one or more central processing units (CPUs), the system comprising: one or more logical expressions that define constraints on one or more service releases; a gateway process receiving service request messages from one or more of said clients for i) identifying said service request message, ii) processing said identified service request message in accordance with one or more of said logical expressions associated with the requested service and iii) providing access to said requested service if the constraints are satisfied.

A further aspect of the invention includes an agent process associated with one or more said clients, for receiving service request messages from an associated client, said message destined for a requested service and applying to said received request message one or more of a subset of said logical expressions associated with the requested service for forwarding to said gateway process.

A further aspect of the invention provides for a method for enforcing policies.

In a specific aspect an embodiment of the invention consists of four architectural components:

i) a Gateway server, which is a network appliance that processes SOAP (define) messages destined for protected Web services. The Gateway coordinates and enforces policies that apply to these services, and coordinates and negotiates security policies with requesters (client).

ii) a Policy Manager, which allows administrators to: establish trust and identity sources that integrate with existing infrastructure; use these sources to define security policies through a declarative policy language of assertions; and modify existing policies and propagate them to existing clients. Through the policy Manager, Web services security becomes an easy, repeatable and reusable administrative task instead of a complex custom development problem.

iii) a SOAP Agent, which establishes a PKI (public key infrastructure) based trust relationship with one or more Gateway Servers, and resides on each Web service requester. The Agent automates the negotiation of security policies between the Gateway and its clients. Client systems send their unadorned SOAP requests to the local Agent, which then takes care of applying the necessary headers and transformations required by the applicable policies. Changes to security policies administered at the Gateway are propagated to the appropriate Agents, which then apply the changes to the messages destined for the Web service in question. Although optional (clients can custom develop applications that conform to the Gateway security policies), the Agent is an integral part of providing true loose coupling between Web services and their clients.

iv) a Policy Assertion Language, (PAL) which ties the three other components together, and provides a language to express the policies created by the Manager, implemented by the Agent, and enforced by the Gateway.

Another aspect of the present invention is to dynamically overlay security on top of existing Web services transactions. In the present model, security is declarative, instead of programmatic; it shifts the responsibility for implementation of security from each individual software developer, and places it in the hands of a security administrator. Declarative Security allows for late, runtime binding to an organization's security policy. This allows an administrator to change policy at any time, and have the update instantly applied to all transactions governed under the policy, all without modifying a single line of code.

The present invention provides a coordinated declarative security model that can be applied not only to the service provider side but also the consumer side of a web services transaction.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
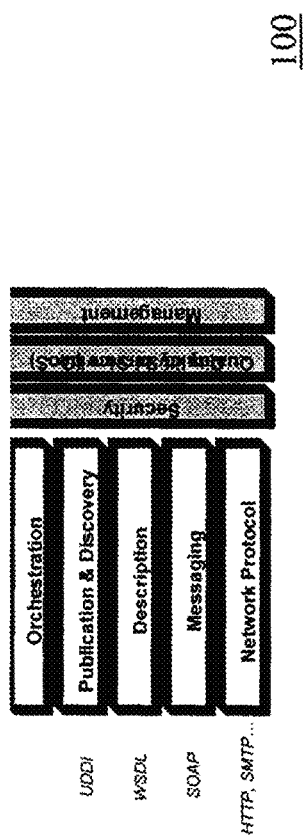
FIG. 1 is schematic diagram of the layers in a service oriented architecture.
Figure 2:
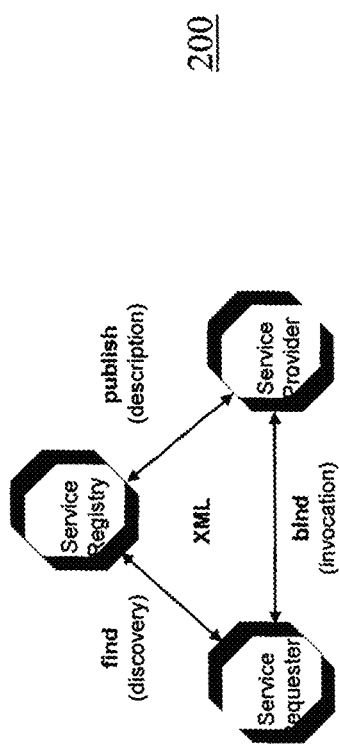
FIG. 2 is a schematic illustration of the roles in a SOA.

In the following description like numeral and references refer to similar structures and functional blocks in the drawings.

Figure 3:
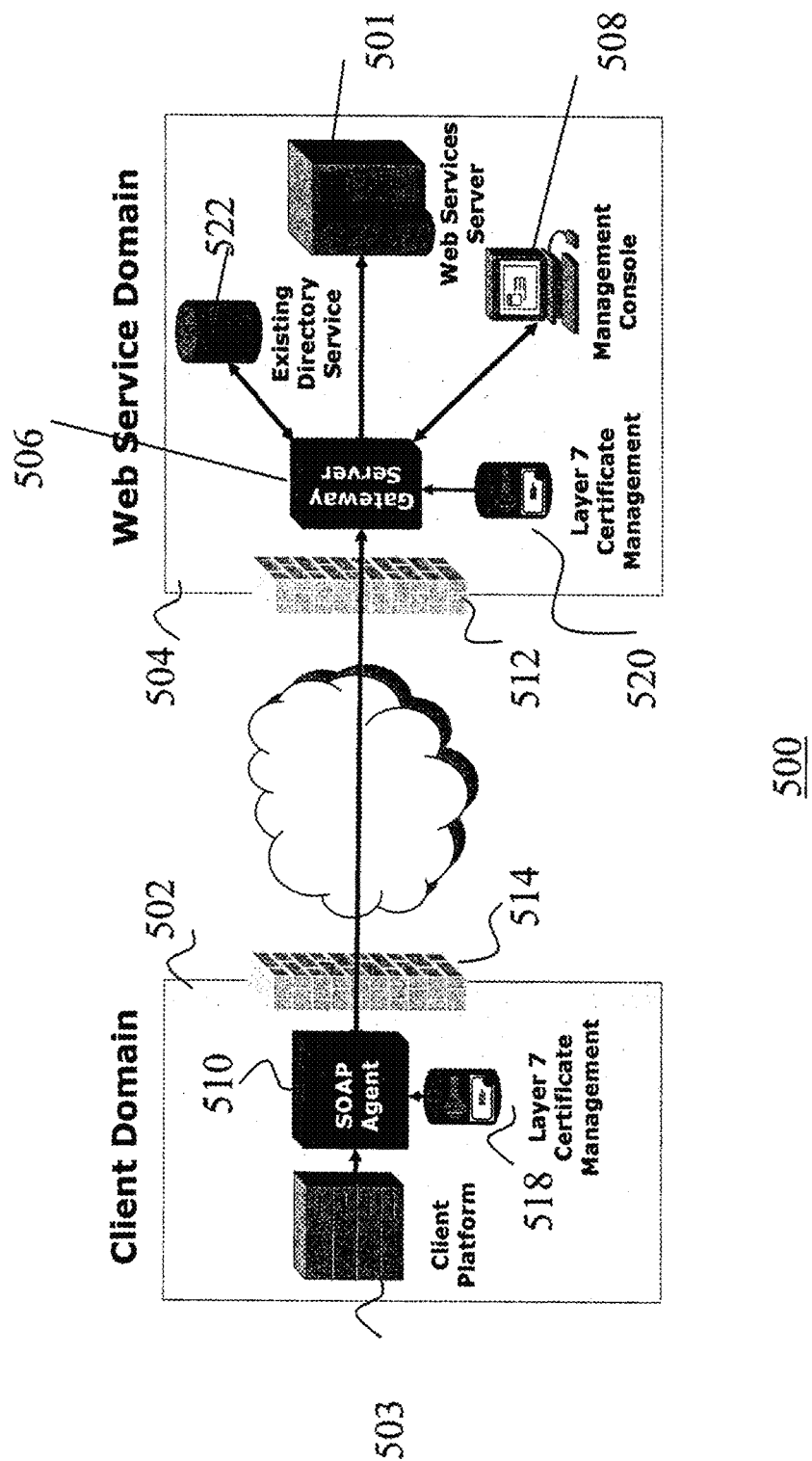
FIG. 3 is schematic diagram of the architectural components in a system of the present invention.

Referring to FIG. 3 there is shown the components for a system 500 for securing Web services 501 according to a general embodiment of the present invention. The system 500 includes a client domain 502 and a Web service domain 504 coupled via the Internet. Communication between the domains are via SOAP messages. Single domains are shown for illustrative purposes only. The client domain includes the client computer 503. The system 500 comprises three major components: a gateway server 506 that resides behind a conventional firewall 508 in the Web service domain 504; a management application software 508 for developing security policies and managing all Web services (the Policy Manager); an agent 510 located in the client domain 502 behind a firewall 512 that secures a transaction according to the policy in effect, before a SOAP message is released to an insecure network (the SOAP Agent); and a programming language that allows administrators to construct complex usage policies and attach them to the protected services (the Policy Assertion Language). In addition the system includes PKI (public key infrastructure) certificate management components 518 and 5520 associated with the client and Web services domain respectively.

The Gateway Server 506 consists of a high performance server executing core messaging, security and management software. Typically residing inside a DMZ, which contains devices accessible to Internet traffic, the Gateway supports an active standby configuration with database synchronization capability.

Collections of Web services 501 can be centrally managed and audited through the management application 508 linked to the Gateway 506. The Gateway 506 may also communicate with an existing directory service 522. The Policy Manager allows administrators to decouple policy control from a service's programmed business logic so that no manual configuration or integration of the Web services themselves is required.

Each of the component functions will now be discussed in detail below.

The Gateway Server

The Gateway Server 506 acts as a gatekeeper mediating all Web services activity entering an organization. It is a software engine to create, publish, and enforce policy for all Web services. It shields access to internal services, ensuring that only those messages that pass all of its security tests are ultimately forwarded to the protected service. The Gateway 506 provides administrators with a single point of management, regardless of whether an organization has a single, standalone Gateway or a cluster of parallel systems for high availability. It centralizes the security management of all Web services using a single, intuitive and consistent user interface, thus eliminating any chance of a configuration error that could compromise the security integrity of the entire network.

The Gateway 506 is fundamentally a message-processing engine. Every Web service published through the Gateway is subject to policy; the Gateway identifies and processes every SOAP message under the policy registered against that service. Internally, services and operations are categorized according to their WSDL representation, which fully describes a Web services API (application programming interface) as it is bound to a transport. The WSDL representation defines how the system can identify a message, through URN namespace, HTTP (hypertext transportation protocol), a SOAPAction header, or binding to a specific URL (uniform resource locator).

Clustering for Performance and Availability

The Gateway includes a number of different, flexible deployment options. Each gateway can operate independently, in stand-alone mode. Organizations requiring high availability and scalability can deploy Gateways in redundant clusters. Clusters members are all synchronized to provide identical views of the policy store, the internal identity provider, and any other common system configuration data.

Simplified PKI Deployment

The downfall of many PKI systems in large organizations has been the complexity and expense associated with setting up a centralized system that interfaces with a diverse number of different applications and clients. This is further complicated by gaps in the standards that limit interoperability between applications. In contrast, the Gateway Server 506 of the present invention operates as its own CA (certificate authority). The integrated CA, provides simplified distribution of certificates to clients, instant and automatic checks of certificate status and revocation, and intuitive management of the system. In a Gateway cluster, a single appliance is delegated to being the root CA; this root appliance is responsible for processing all client signing requests, and creation of all SSL (secure socket layer) certificates in the cluster. In one embodiment the root CA's private key store is password protected and encrypted using a triple DES cipher. For added physical security, it may be persisted to a removable USB dongle that administrators can be safely separate from the appliance during regular operation. Other encryption techniques could equally well be used.

Simplified Management of SSL

The Gateway 506 of the present invention greatly simplifies the management of SSL in Web services transactions. SSL is an assertion in a policy that an administrator can choose to activate at any time. Each Web service 501 can use SSL between the client and the Gateway Server, and/or between the Gateway and the downstream service itself. Having the ability to disable SSL on the last mile is especially important to many organizations. This eliminates the need to have server-side certificates on every internal system (which is expensive and a significant administrative burden), yet it still protects the segment of the connection that traversed the public Internet. It also eliminates the need to reconfigure existing Web services to support SSL, which often requires clumsy code modification, changes to server configuration, and local, client-side management of certificates in a trust store. Finally, SSL is computationally expensive. A common rule of thumb when sizing Web servers is that SSL increases processing burden by 30%. In a large installation, this can become a significant expense.

Centralizing SSL processing to the Gateway Server 506 greatly eases administration and cost, since only a single certificate is required (included with every Gateway Server). The Gateway Server 506 architecture allows it to accept a number of third-party SSL acceleration boards. Experience on high volume web sites has proven this a cost-effective solution to increase transaction throughput and promote overall system scalability.

The Gateway Server 506 can also make use of SSL metadata when configuring security policy. HTTP basic authentication headers can be a source of credentials for any authentication assertion. Administrators can enable client-side certificate authentication—an optional feature of SSL that is well suited for sites requiring strong client authentication. A standard certificate authentication filter accepts and validates all client-certificates exchanged over SSL.

This fine-grained control provided by the present assertion framework is especially important for installations that support multiple security models. For example, an organization may simultaneously support legacy SSL transactions with one trading partner, and newer WS-Security based policy with another. Although the two transactions mine credentials from different sources, the Gateway 506 uses the same assertion and pluggable provider to authenticate against the local identity server. This greatly simplifies administration, and lessens the chance of introduction of a security hole through oversight.

Augmenting UDDI and WSDL

UDDI and WSDL are both important parts of Web services; however, both neglect to address security in a useful manner. The present invention addresses this problem. The UDDI uses SOAP as an access method; thus, the same finely grained, flexible security model for regular Web services is applicable to any private UDDI registry. Accordingly, the Gateway Server can act as a secure proxy and provide identity based access policies to any internal UDDI server, thus making good on the promise of service publication to trading partners. Furthermore, through the use of transformation filters, UDDI query responses can be personalized to fit the requester, providing true UDDI proxying. This finally extends all security elements to UDDI, including authentication, authorization, access control, confidentiality, personalization and even non-repudiation.

Figure 4:
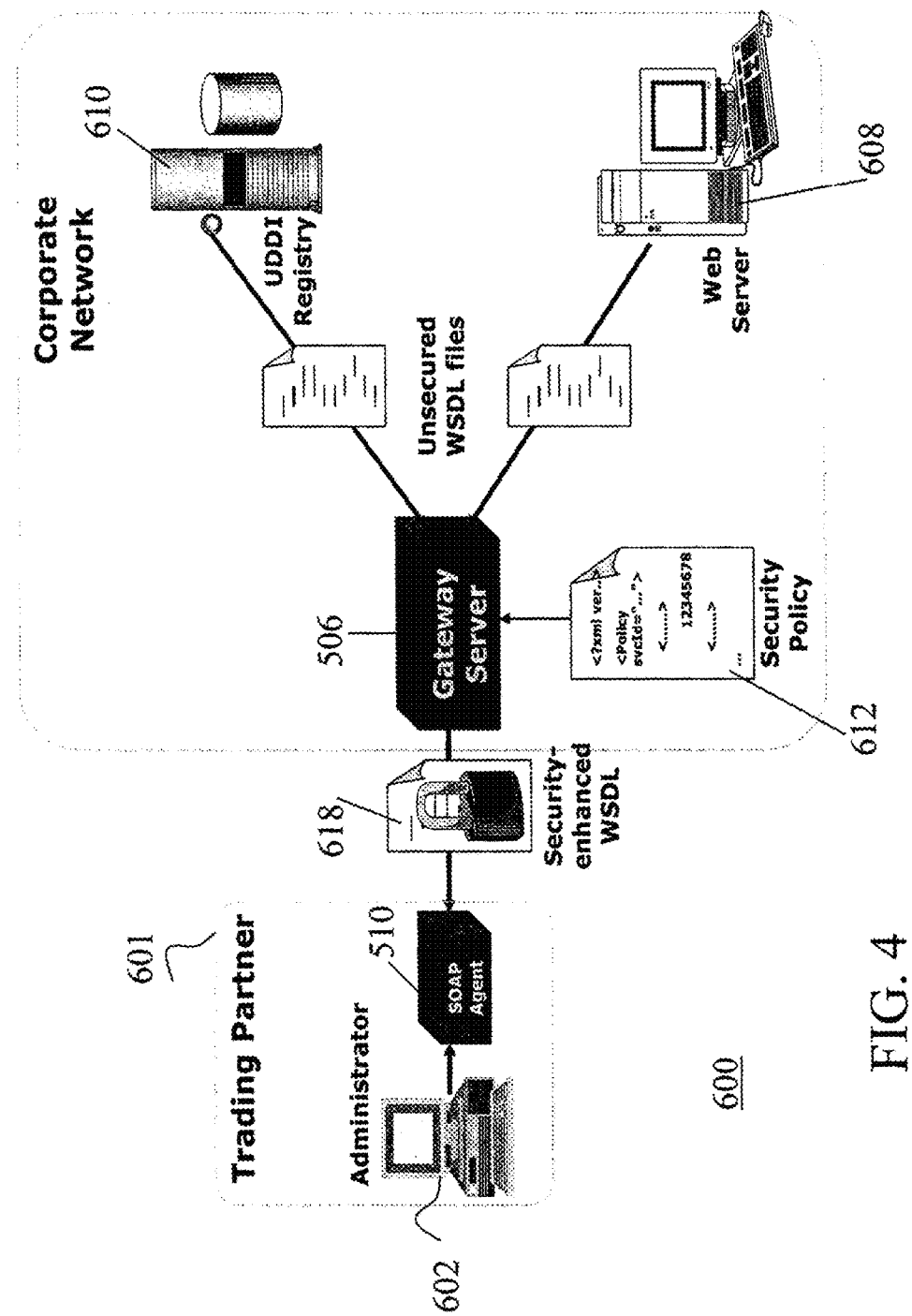
FIG. 4 is a schematic illustrating augmenting an WSDL.

WSDL provides a means to describe a service in both abstract and concrete terms, but it offers nothing to accommodate security. Referring now to FIG. 4 there is shown schematically a typical Web services application system 600, according to an embodiment of the present invention, illustrating message flow when a client downloads a WSDL description through a Gateway, either in response to a UDDI query, or as a standalone URL. The system 600 shows a trading partner client domain 601 having an administrator computer 602 coupled through the SOAP agent 510 to the interne. The Web services domain identified as the corporate network includes the gateway server 506, a web server 608 and a UDDI registry 610. When a client downloads a WSDL description through the Gateway, the Gateway can optionally augment the file to describe a secure implementation of the service. The simplest augmentation is simply a rewriting of the internal URL in the soap: address element of a SOAP message inside the service element to point to the Gateway instead of the actual physical service location. This assists in the automatic generation of stubs or proxies for the remote service, ensuring that they route requests through the Gateway and thereby subject to the policy 612 in effect. This is termed Endpoint Address Translation (EAT), and may be considered to be an application-level security analog of NAT (network address translation) and thus even more important to a mature security model.

But WSDL without a concrete security policy describing how to access the service is still not a complete solution. Ideally, the WSDL augmentation should describe the security expectations of the Gateway for access to that service. Such as for example, does this service require authentication? What kind of credentials are required? Are they rendered into HTTP headers or WS-Security headers?

Thus, the Gateway can bind a security policy 612 to a WSDL description, and publish this aggregate description 618 to its clients. The combination of these two documents fully describes a secure version of the service. This provides a standards-based method for adding policy assertions to WSDL that is compliant with existing client-side code generation tools, and "future proofs" the investment against the time when security-aware, third-party code-generation become available.

Credential Chaining

With the proliferation of corporate Intranet sites, organizations quickly identified the need to unite all their disparate credentials under a single, global ID. Web services share the same challenge, and the present invention provides a solution to this issue. Each Web service can be configured to authenticate against a global ID (using any of the credential sources, such as basic, certificate, digest, etc), which is then chained (or mapped) to credentials appropriate to a local service ID, such as identity-based local database accounts.

The Gateway can also consolidate multiple incoming identities into a single downstream identity, such as a limited access database account. This removes the burden of managing multiple identities, which are likely to change frequently, on the downstream service. For example, whenever the remote credentials change, the change need only be reflected on the outgoing Gateway, not the actual client. This is a simple, centralized administration task, rather than a programming challenge and can realize tremendous savings during deployment of a large number of clients.

The SOAP Agent

Figure 5:
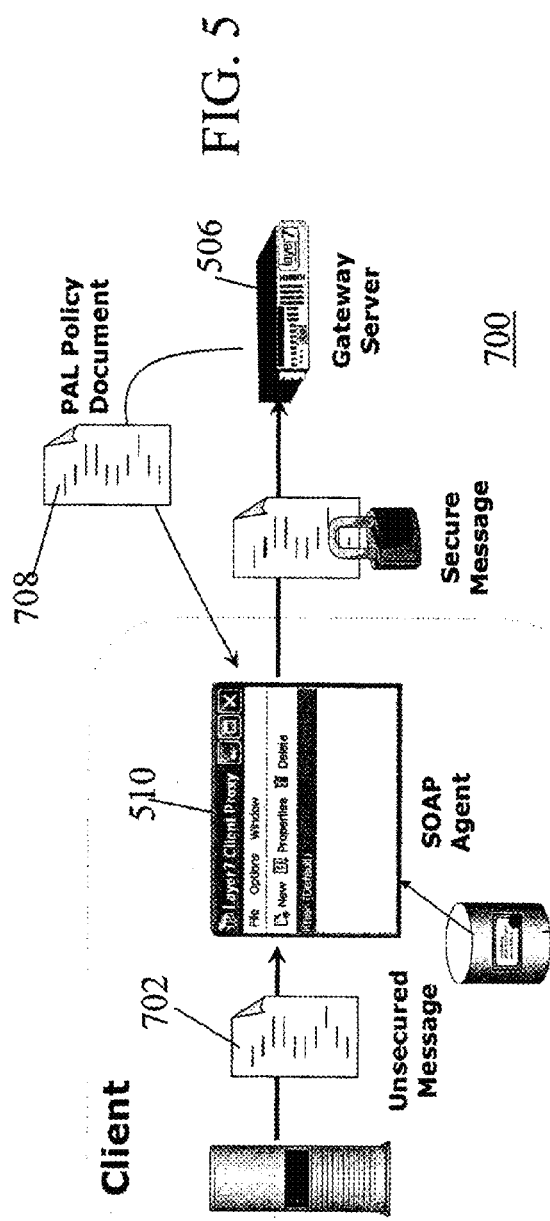
FIG. 5 is a schematic diagram showing the operation of the SOAP agent.

Referring to FIG. 5 there is shown a schematic diagram of the client side of a Web services system. The gateway is only half of a security solution. Without this support, client-side programmers would be forced implement their own security against a security policy set by the administrator, a difficult and tedious task which is also prone to error, and expensive to maintain. For example if a VPN server came with no clients, and simply expected that users would build their own IP security implementations. This would clearly be untenable and unsustainable, but it is not unlike what many Web services firewall solutions expect.

The SOAP Agent simplifies the task of layering security onto Web services transactions. The Agent is the key to the late-biding, declarative security model of the present invention. The Agent understands and follows the policy directives of the Gateway; policy changes made by an administrator are instantly loaded and applied on the Agent without changing a line of code in the actual Web services application. The Agent also manages client-side certificates issued by a Gateway, simplifying this complex process tremendously over existing browser and email models and providing the benefits of strong authentication, digital signing, and message-based encryption.

As shown in FIG. 5, the SOAP Agent intercepts a Web services transaction (unsecured message 702) before it is sent across the network to the Gateway. The Agent loads policies (the PAL policy document 708) from the Gateway 506 the first time a service is called. These policies are specific to the clients being serviced by the agent and are normally a subset of the policies associated with the services protected by the gateway. For every SOAP message the the WS-Security standard, and that the entire message body signed by the client's private key. Agent receives, it decorates the message according to the rules defined in the policy. For example, the policy may demand that the message body be encrypted with AES encryption under The Agent will interpret this policy, and modify the transaction accordingly before sending it downstream to the Gateway.

Policies are cached on the Agent, and are reloaded whenever a transaction fails because a policy was changed on the Gateway. In this manner, security policy changes are instantly adhered to by all clients. For example, suppose a Web service is deployed during a testing phase without any message or channel encryption to aid in debugging. Once testing is complete, the security administrator can select SSL-based security in the policy for that service. The Agent will then be refused entry once (because it is not compliant with the current policy), prompting it to reload the policy description and continue, this time using SSL for the connection. All this will happen with no code changes on the client—and indeed, a user would not even be aware that a significant change in transport occurred.

Of course, not all policy assertions are appropriate for export to the client. Authorization lists, for example, are relevant only to the Gateway, as these could be exploited by a hacker if they were made public. Thus, the Gateway publishes a filtered "view" of the policy in effect, describing only what morphological changes are required of the message or transport, and nothing about identity expectations, internal routing information, etc.

The SOAP Agent can be run in two different modes: one standalone, command-line driven, appropriate for server installations; and one with a rich Graphical User Interface (GUI) 704 for more interactive users. In both modes, user intervention is minimal or non-existent, depending on security requirements. For example, passwords to unlock a client-side certificate or credentials to assert an identity on the Gateway can be entered when the Agent is started, or they can be added only as needed: the Agent will launch a popup query for credentials the first time they are demanded by a remote server.

Web services clients should not require code modification to use the Agent. Enabling an application to make use of the Agent's services is as simple as changing the URL indicating the target Web service to point to local host instead of a remote server. For the majority of Web services development kits, this is easily accessible in an application property file (it is common for the target URL to change frequently as an application is moved from development to testing to deployment, so this property should be easily accessible). In some instances in which client stubs are automatically generated from a WSDL file describing the service, a minor modification to the location attribute of the soap: address element can be applied. This can be done either automatically by referencing the WSDL through the Gateway WSDL query and augmentation service, or by modifying the WSDL source file and re-applying the stub generator.

Figure 6:
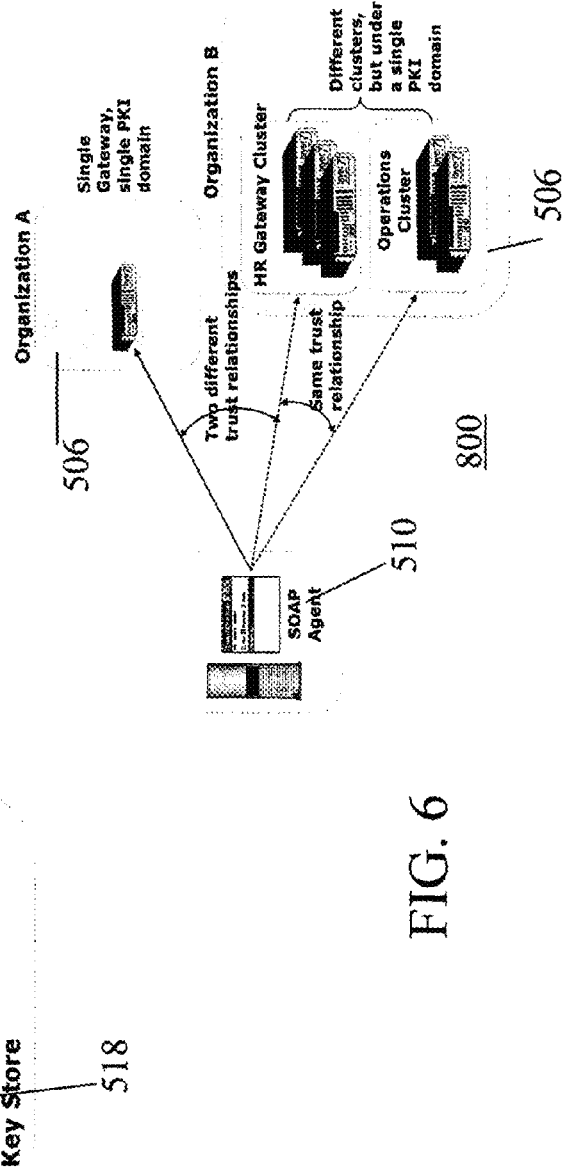
FIG. 6 is a schematic diagram showing a SOAP agent having multiple trust relationships.

A single SOAP Agent can also be bound to multiple Gateways as shown schematically 800 in FIG. 6. These can be within a single organization, but under a single PKI administrative domain. For example, a large organization may have multiple Gateway clusters in different departments, united under a single PKI root certificate. In this case, the Agent is configured to trust the single organizational root certificate and is bound independently to the departmental clusters. A binding can also co-exist within the same Agent to a completely separate organization, this with its own independent root certificate. Transactions will simultaneously be routed to the correct Gateway, and the Agent will ensure that the appropriate certificates and trust relationships are applied to the appropriate transactions.

The Policy Assertion Language

Web services are invoked through SOAP messages. The present system inserts itself into a Web service's SOAP stream, augmenting it, transforming it, and inspecting it. The processing algorithm that the SOAP Agent and Gateway Server apply to a SOAP stream is what is termed Policy. Policies or logical expression may consist of chains of concrete rules, preconditions, and tests that Web services transactions are subject to if they are to pass through the Gateway. The Gateway securely publishes a subset of its policy expectations that are appropriate to each SOAP Agent to allow the Agent to prepare SOAP messages into a form that the appliance will accept (subject, or course, to the tests embodied in the policy).

Every service published to the Gateway Server has a policy attached to it. These policies are implemented as a collection of policy assertions using a Policy Assertion Language (PAL). An assertion represents a statement about the state or content of a message. Usually, every assertion must resolve to either true or false. For example, an authentication assertion might state: this message must provide HTTP basic credentials. A routing assertion might declare: route this message to the downstream URL https://ws2.layer7tech.com/Stocks/quoteService.

An assertion then is the embodiment of a processing algorithm and may contain some additional properties. In the first example, the processing algorithm extracts the HTTP Authorization header from a SOAP message bound into an HTTP POST, as per the SOAP specification; in the second, it is to POST the stream to the downstream URL. The first example has no set properties but clearly has state defined as a side effect—that is, the extracted credentials. In the second example, the downstream URL is a property associated with the assertion. Properties of an assertion are instance variables, not static; as we will see, they can take on different values in different contexts.

Identity is another common assertion. For example, an identity assertion might state that: the message must contain user Alice's credentials. In this case, the processing algorithm is to validate the credentials against an identity server, such as a corporate-wide LDAP server. The property for an identity assertion is the unique identifier for user Alice, and of course a reference to the identity server hosting this identity.

But assertions on their own can lead to numerous ambiguities. For example, how can one validate an identity assertion if an associated authentication assertion, which declares where to locate credentials in a message, is not evaluated first? Similarly, if a routing assertion executed prior to validation of an identity assertion, the policy containing these would not be very effective if its intent is to protect the downstream service from access by unauthorized users. To remedy this, out technology provides a very rich and unambiguous processing model that governs how policy is applied to a SOAP message (the Gateway SOAP Processing Model).

The PAL provides a rich policy expression language where policies are represented as a tree of policy assertions. Internal nodes of the tree are called composite assertions and provide a mechanism to express conjunctions (logical AND) and disjunctions (logical OR). These composite assertions collect sub-assertions as an ordered list of children, where the order defines an explicit processing model. For example, a composite assertion might declare that: all child assertions must evaluate to true (AND). Under this processing model, every child is evaluated, from top to bottom. Execution of sub-assertions is suspended if any assertion evaluates to false, and the resulting composite assertion evaluates to false. Another composite assertion states: at least one assertion must evaluate to true (OR). Under this processing model, every child assertion is evaluated until one resolves to true, at which time further execution of any remaining children is suspended and the composite assertion returns true.

Root Policy Assertion

At the root of the policy is a composite assertion that declares that all immediate children must evaluate to true. The Gateway Server evaluates each child in order, from top to bottom; ordering is important—as observed above, there are circumstances in which an assertion is only relevant if a previous assertion has already been evaluated and any side effects of its operation are available for inspection.

Transport Security Assertion

The first child assertion declares that SSL transport is a requirement for this message. The Gateway validates that this is the case, and proceeds to the next child assertion. Suppose, though, that the sender delivered the message using regular, clear text HTTP without SSL. In this circumstance, the SSL assertion evaluates to false, and the composite assertion at the root must also resolve to false. This results in a rejection of a message by the Gateway, which indicates this to the client in a returned SOAP fault.

Authentication Method Assertion

The next child assertion demands that the message contain HTTP basic authentication credentials. These are in a known location, the HTTP metadata, and are extracted from the message and kept for later processing.

Identity Assertions

The next child is not a leaf node, but another composite assertion—this one declaring that at least one of the child assertions is true. This composite assertion exclusively contains identity assertions—obviously, it is implementing an authorization and authentication test.

Routing Assertions

The final assertion is a routing assertion. When this is executed, the message is sent to the URL set as a property of the assertion. This operation may include credentials for the downstream server—a feature called credential chaining—and may use SSL to ensure confidentiality, integrity, and server authentication for the downstream transaction. If this final assertion evaluates to true, indicating successful transmission of the message downstream, then the root assertion also resolves to true, and any data received from the routing assertion is returned to the calling client.

Identity Based Policy Modeling

Modeling policy as an ordered tree of assertions can be tremendously powerful and flexible. Deep, nested structures can be constructed to define a logical message-processing model that accommodates extremely complex service definitions and implements multi-step security processing requirements. For example, identity-based polices, in which a different processing model is applied depending on the proven identity of the requester, are as simple to model as a sub tree of the relevant assertions, subordinate to each identity assertion.

In this light, policy becomes much more than a means for defining simple security definitions: it can make declarations about reliability, transaction boundaries, routing through intermediates, message transformation, etc. It also forms the basis of negotiation between trading partners, where security expectations provide options that need to be resolved into a security contract—much like the SSL cipher negotiation—under which trading can be safely conducted.

By participating in both sides of the transaction, using policy to coordinate each side, The Gateway Server allows Web services applications to be completely insulated from the uncertainty of emerging standards, while providing the beginning of true loose coupling between services.

PAL Policy Assertions

PAL assertions are implemented using a Java interface definition, and it is therefore very easy to extend the basic set.

| CREDENTIALS |
|---|
| HTTP basic authentication |
| HTTP digest authentication |
| HTTP client-side certificate authentication |
| WS-Security basic authentication |
| WS-Security digest authentication |
| WS-Security client-side certificate authentication |
| IDENTITIY |
| Identity in internal provider |
| Identity in external LDAP provider |
| Transport protocol |
| Routing information |
| SECURITY |
| SSL transport enabled |
| WS-Security signature validation |
| WS-Security encryption/decryption |
| COMPOSITE ASSERTIONS |
| All assertions must resolve to true (logical AND) |
| At least one assertion must resolve to true (logical OR) |

The Policy Manager

Figures 7, 8:
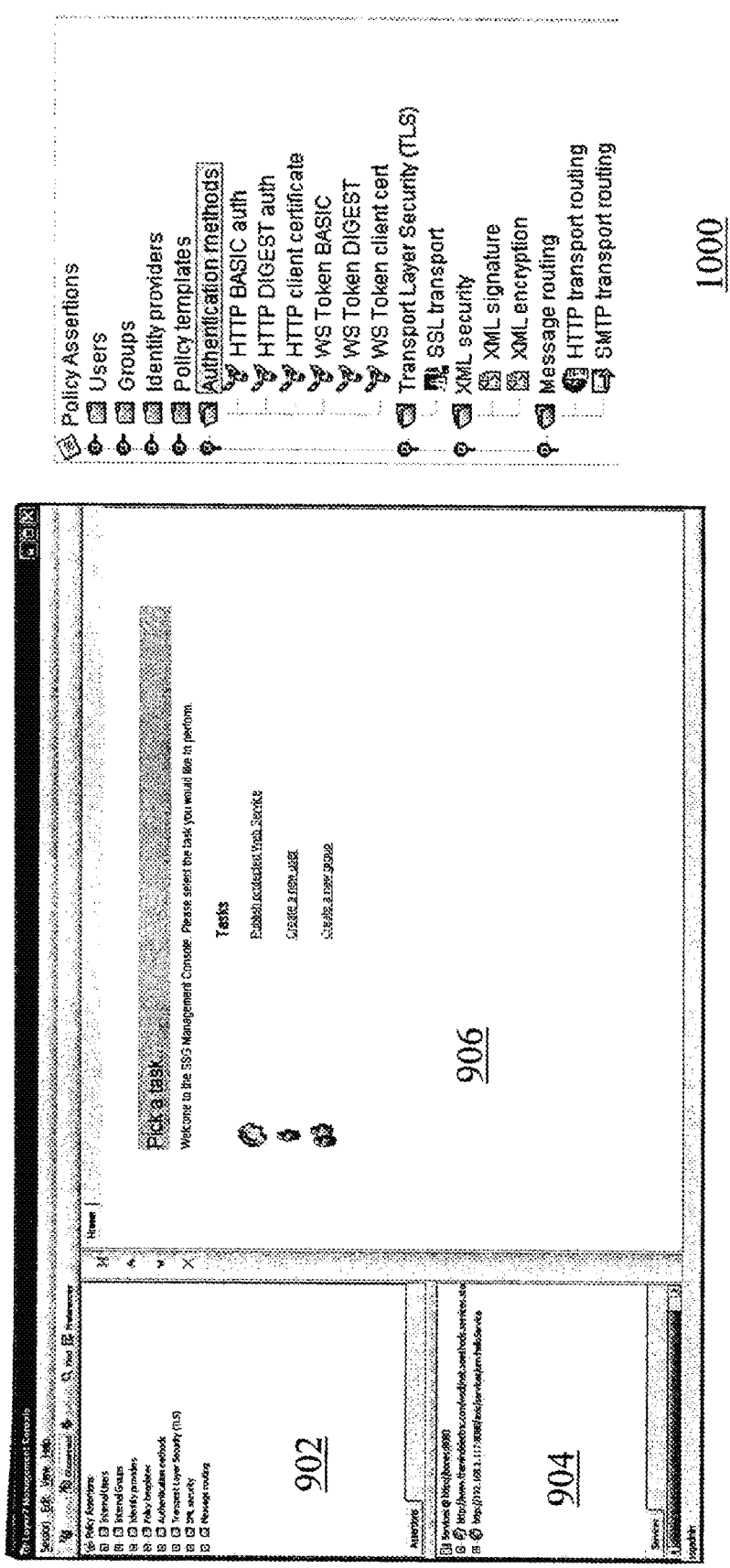
FIG. 7 shows a screen layout of a policy manager interface.
FIG. 8 is a schematic showing a list of objects in a policy manager.

Referring to FIG. 7 there is shown a screen layout of the Policy Manager GUI 900 which provides a single unified view into the Gateway Server 506. Its primary purpose is as a security policy editor, providing a means to rapidly set up and manage a tree of security assertions associated with a Web service. In addition to policy editing, the Manager is the primary interface to manage users, configure the Gateway, and monitor its continuous operation.

A security administrator can direct the Policy Manager 900 to manage any Gateway Server in a cluster; any changes made to the Gateway configuration through the Manager will be instantly propagated among all other peers in the cluster. Administrators simply need to know the URL of the Gateway they wish to manage. The Gateway is pre-configured with a single administrative identity with membership in an administrators group; additional administrative identities can be added as needed, using the Manager. All communications between the Manager and the Gateway are fully encrypted, and takes place over port 443. The Gateway publishes Web services interfaces for all major administrative operations, which provides a path to fully integrate Gateway management and policy creation into third-party network management tools.

Initial View

The Policy Manager GUI 900 is a rich policy environment, supporting multiple window panes, drag-and-drop operation, and multiple wizards to assist in rapidly configuring Web services security. It can be installed on either a Windows or Unix system using a single-click installation wizard. The Manager has an identical look-and-feel on both operating systems, simplifying system migrations and providing maximum deployment flexibility for operations staff.

The upper left frame 902 of the GUI contains the palette of objects that exist on the system. New objects can be added, modified, dragged into policies, etc. The lower left frame 904 lists all the services under management in the system. The right pane 906 is reserved for policy editing. At startup, this frame also contains several convenience links that launch service and user-oriented configuration wizards.

Building a Policy Using a Service Wizard

Administration overhead can be an impediment to business; it can also be the cause of security holes. Suppose a company is in an aggressive expansion mode, rapidly adding new trading interfaces to its core systems. Their need for rapid deployment of these new services to trading partners—driven by market fundamentals—is often at odds with the administrative requirements of tight security. In these conflicts, security too often loses.

The management console 508 includes rapid but secure deployment of Web services, using wizard interfaces and dynamic discovery technology. Rather than forcing an administrator to configure every new Web service manually, the Policy Manager allows administrators to discover new Web services published in WSIL files, or in WSDL descriptions published at any URL, whether on the Web, or on a file system. Discovery mechanisms for UDDI, as well as plug-ins for major commercial and open-source application servers are used. These will support the export of service descriptions for every deployed service—a great advantage for organizations without UDDI.

The wizard interface allows for immediate security provisioning of newly discovered Web services using generic policy templates. Administrators can fine-tune the security policy of a service at any time, such as changing a routing parameter, or adding a new user to an authorization list.

A simple example is using the wizard to securely provision a new service—in this case, a simple "Hello, World!" application—that resides on the internal network. This is a basic service, with no built-in security. Suppose that the administrator wants to make it available to outside trading partners, but corporate security guidelines dictate that all external systems must authenticate on the corporate LDAP directory before being granted access to an internal application.

As a first step, the administrator enters the URL for the WSDL describing the service. The Gateway Server uses WSDL as its internal representation of a service. The WSDL document is used to determine how to uniquely identify the service from its message (e.g. is the HTTP SOAPAction header used, URN namespace, incoming URL, etc), as well as describing the internal URL where the service resides. In the service pane of the Manager, where all the services under Gateway administration are listed, the entire WSDL description is available for review.

Note that if a WSDL description does not exist, an alternate wizard step exists to allow an administrator to describe a service based on only minimal information.

Next, the administrator can override the URL where the service resides. This is especially useful if multiple versions of the service exist, such as in test and production environments. The administrator can also add credentials for the downstream service. This feature, called credential chaining, allows mapping or consolidation of incoming credentials to an identity that is relevant to the downstream server.

Finally, the administrator describes the incoming security expectations for the service. An administrator can configure whether a client needs to provide security credentials, and where these credentials must reside (using HTTP headers, or WS-Security conventions). In either case, authentication can take place using basic user name and password, digest authentication, or certificate authentication. SSL security can be set on or off from this wizard pane. Additionally, the administrator can construct an authorization list using identities from the internal provider, or from an external source such as a remote LDAP server.

The Policy Editor

Fine-tuning of a policy, regardless of whether it was defined manually, or through a wizard, is accomplished through the policy editor frame. The policy editor presents the entire assertion tree, and provides several interfaces to effect morphological changes to the tree. Composite assertions can be added and deleted or moved anywhere in the tree. Leaf nodes can be configured, moved, or deleted, either through a popup menu or as a drag-and-drop from the palette.

The Palette

Referring to FIG. 8 there is shown a screen display 1000 of a palette which provides an efficient way to navigate to important objects in the Manager 508. The palette supports drag-and-drop of most objects into appropriate locations in a policy in the policy editor frame.

Users and groups in the internal identity provider are managed in the palette. Administrators maintain external identity providers, such as connections to corporate LDAP directories, in the palette. Properties appropriate to identity provider instances, such as LDAP URL, search base, etc, can easily be configured from the palette entry. When an administrator creates a policy template, it is made available here. Policy templates provide a means to quickly configure a customized policy that builds on the basic policies created in the service wizard. Finally, all assertions are available in the palette to support rapid construction of policies in the editor frame.

Identity View of Policy

An Identity view of policies may be understood as follows. Consider the following situation: suppose that two different versions of the stock quote service exist, one that provides instant quotes, and one that provides quotes subject to a 20-minute delay. The interfaces for each of these services are identical; thus, the SOAP messages sent to a Gateway cannot be associated with one service or the other simply by their form. Instead, a differentiation may be made depending on identity. Preferred users—perhaps executives in the organization—are to be routed to the instant quote service; all other users are routed to the delayed quote interface.

This is easy to provision on the Gateway using identity-centric policies. In this case, make the routing assertion subordinate to the identity assertion. This could be done in the regular policy editor view; however to assist in building such policies, the Manager includes a specialized Identity View, in which the policy tree is rooted at a static Identity node. The immediate children of this node are the different identities authorized to under this policy to use the service. Each of these identities can have a different assertion sub tree, including any security assertions (such as SSL must be on), message transformational assertions, and of course, routing assertions.

The Solution Architecture

Modular, Connector-Based Architecture

Figure 9:
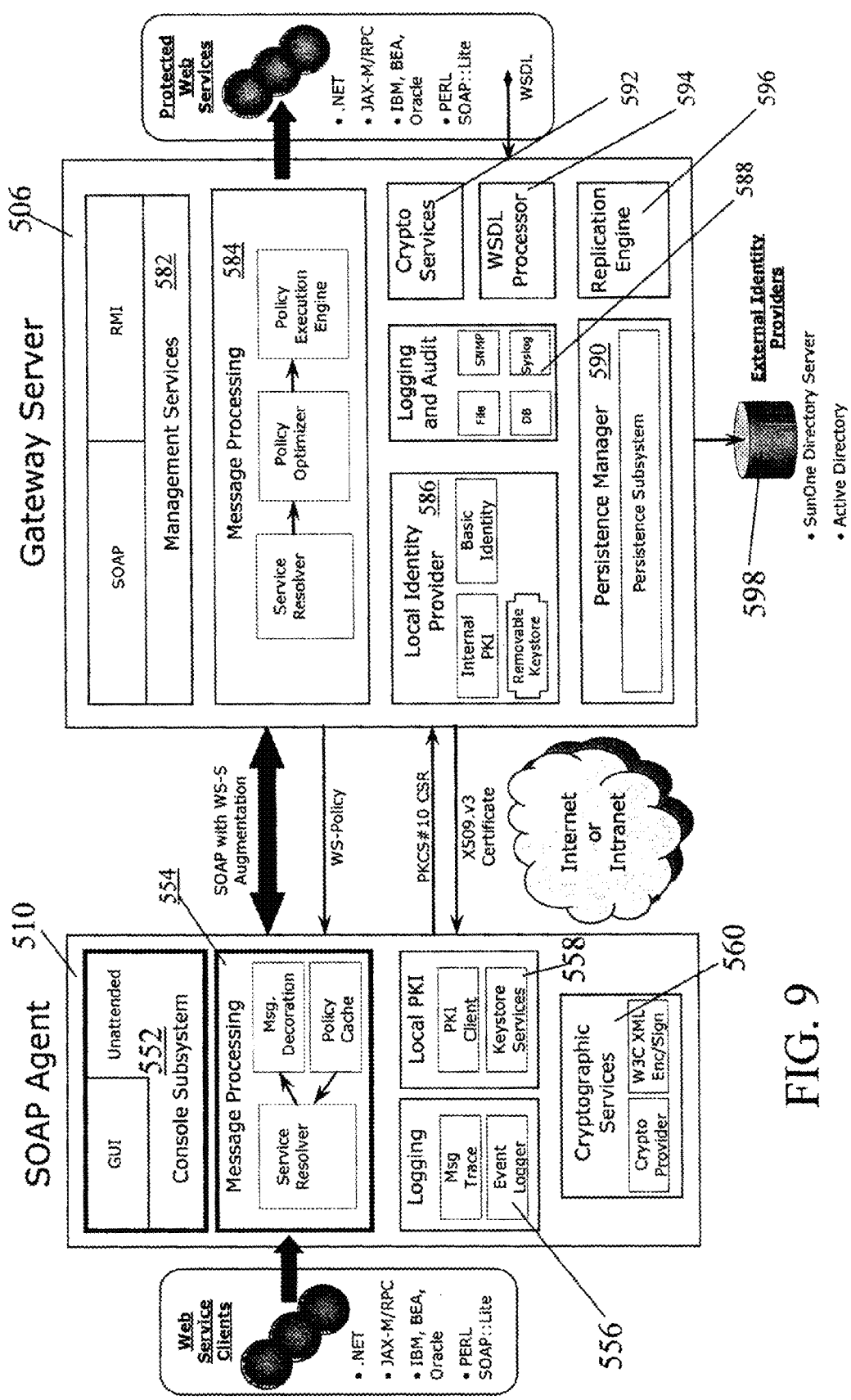
FIG. 9 is a schematic diagram showing the architecture of a SOAP agent and Gateway server according to the present invention.

Referring now to FIG. 9, there is shown an architecture for the SOAP agent 510 and Gateway server 506 according to an embodiment of the present invention. The SOAP agent comprises a console subsystem 552, a message, processing subsystem 554, a logging subsystem 556, a local PKI 558 and a cryptographic services subsystem 560. The gateway server includes a management services subsystem 582, a message processing subsystem 584, a local identity provider 586, a logging and audit subsystem 588, a persistence manager 590, crypto services 592, a WSDL processor 594 and a replication engine 596. In addition the gateway communicates with external identity providers 598.

The architecture is modular and extendable, in a true service oriented architecture. It makes extensive use of pluggable service modules to accommodate continuously shifting specifications. The message handling subsystems, for example, supports pluggable handler modules. When a message specification changes, or an entirely new message structure appears, a new handler can trivially be integrated into the system.

Pluggable provider modules provide a means to interface with external systems. This solution is designed to integrate with existing infrastructure in the corporate network, such as identity servers, authorization systems, logging sinks, network and systems management applications, etc. Integrating common identity systems such as LDAP (Lightweight Directory Access Protocol) or Microsoft's Active Directory is a trivial exercise using the pluggable interface design. In addition, a well-defined interface exists for the identity provider system, allowing simple extension for unusual or custom identity servers. Similar modules exist for authorization services, allowing integration with existing LDAP or Active Directory groups. Other connectors such as one that implements the emerging SAML (Security Assertion Markup Language) specification, allowing integration with third-party authorization products that operate as SAML assertion servers has been developed. Similarly, an XKMS (XML Key Management Specification) connector has been developed to integrate with existing corporate PKI systems.

Scalability and High Availability

Functionality in this kind of solution has little value if it cannot handle high and variable transaction rates. Despite its modularity and flexibility, the Gateway defines an efficient message-processing path. This is an important design point. Parsing and serialization technologies have been improved, using a variety of techniques such as pull parsing and pattern recognition, to ensure that this traditional processing bottleneck is not a cause of undue latency on the system. All assertions are compiled to ensure the fastest possible performance. Policies are cached on the Gateway to minimize retrieval times once a message is identified and is ready for processing. Strategic use of state information further speeds processing, and extensive use is made of asynchronous IO (both at the network and file levels) to ensure that operations such as logging, socket writes, etc are removed from the latency calculation. All transport connectors make use of scalable socket programming; this allows adjust to the system for the most efficient balance between sessions and threads.

The hardware appliance allows tuning of the system for maximum performance. The appliance Operating System (OS) is hardened for security, but also tuned to maximize performance for the Gateway Server application, something that would be impossible for a software-only solution on a general purpose OS. As transaction volumes grow, Gateway Servers can be clustered, using our stateful clustering technology. Clusters support inexpensive, third-party load balancers to distribute transaction volume across the Gateway Servers. For example, a conventional HTTP level sprayer can easily accommodate HTTP-bound SOAP messaging.

Clustering appliances also provides high availability. Gateway Server clusters share configuration information (user profiles, policies, etc) between appliance pairs in a peer-to-peer relationship. Any changes made by an administrator to systems in a cluster are immediately replicated among all peers. Any changes made to policy are further instantly loaded into cache to ensure minimal possible latency for policy change propagation in a cluster—essential when responding to an evolving security threat. If a system is offline for any reason during a change, it will re-synchronize as part of its restart operation, ensuring that stale policies or configuration data are not used in any subsequent transactions.

Audit, Logging, and Monitoring

The Gateway Server features richly configurable logging and alerting framework. Both logs and alerts can route to a variety of different sinks. A connector is available for simple file system logging, with rotation features. Logs can sink to UDP and TCP sockets. Log entries are in simple text format; these can be easily rendered to different target formats. These logs can also be viewed anytime through the Policy Manager, with simple filtering based on severity.

The SOAP Agent similarly features extensive logging of events; these can be viewed selectively from the Agent GUI, or in a user-accessible text file. Client logs can include a trace of all transaction content for debugging purposes.

A fully configurable, event-based alerting system will also be available in the next major release. This will allow administrators to set traps for important system events, such as low memory, low disk space, unusually high access rates or large numbers of access failures. These alarms can be propagated to email, pagers, or third-party network management package.

In summary, Web services technologies offer a very compelling vision of loosely coupled systems, where services are published, discovered and invoked just in time. Unfortunately, real world deployment of Web services is hampered by issues such as the need to secure access to these services, and the problems of describing policies around these implementations and coordinating them with the various clients. All current security implementations and mechanisms introduce brittleness and tight coupling between client and service, leading to solutions that are not reusable, and that require expensive re-development any time security policies or agreements change. The problem is not addressed by the current platform vendors since the bulk of their efforts has been directed at the provisioning side of the equation, with no consideration of how both sides of Web services transactions (provider and consumer) are to coordinate.

The solution presented here is the first solution to tackle the problem of both managing and coordinating security, end-to-end across a Web Services integration lifecycle. It consists of three major components: a server that resides behind the conventional firewall (the Gateway Server); a administrative application to develop security policies and manage all Web services (the Policy Manager); an optional client-side agent that secures a transaction according to the policy in effect, before the SOAP message is released to an insecure network (the SOAP Agent); and a rich policy expression language (the Policy Assertion Language).

This is a high performance, high availability solution that allows administrators to decouple control of security and integration policy from a service's programmed business logic. Collections of services can be centrally managed and audited, virtually eliminating manual configuration or integration of the Web services themselves. Client-side interactions can be completely automated, dynamically reflecting changes in security while removing the complexity associated with the management of keys, certificates and policies.

As will be apparent to those skilled in the art in light of the foregoing disclosure, many alterations and modifications are possible in the practice of this invention without departing from the spirit or scope thereof.

What is claimed is:

1. A system for securing web services on one or more server computers delivered to one or more client computers, comprising:
   one or more logical expressions residing on said one or more server computers that define rules that must be satisfied in order for a web service provided by said one or more server computers to be accessed by said one or more client computers;
   an agent process residing on said one or more client computers, said one or more logical expressions are cached on said one or more client computers at a first point in time, said one or more logical expressions residing on said one or more server computers are updated at a second point in time subsequent to said first point in time, said agent process generates a service request message for said web service based on at least a subset of said cached one or more logical expressions subsequent to said second point in time, said agent process transmits said service request message for said web service to said one or more server computers; and
   a gateway process residing on said one or more server computers, said gateway process denies access to said web service in response to receiving said service request message, said agent process causes said one or more logical expressions that were updated at said second point in time to be cached on said one or more client computers in response to said service request message being denied by said gateway process.

2. A system as defined in claim 1, wherein said agent process generates said service request message for said web service at a third point in time subsequent to said second point in time.

3. A system as defined in claim 1, wherein said one or more logical expressions include a rule set.

4. A system as defined in claim 1, wherein said one or more logical expressions include an assertion.

5. A system as defined in claim 1, wherein said one or more logical expressions include message rerouting information.

6. A method for securing web services on one or more server computers delivered to one or more client computers, comprising:
   storing one or more logical expressions on said one or more server computers that define rules that must be satisfied in order for a web service provided by said one or more server computers to be accessed by said one or more client computers;
   transmitting said one or more logical expressions to said one or more client computers at a first point in time to be cached on said one or more client computers;
   updating said one or more logical expressions stored on said one or more server computers at a second point in time subsequent to said first point in time;
   receiving at a gateway process residing on said one or more server computers a service request message for said web service from an agent process residing on said one or more client computers;
   processing said service request message in accordance with said one or more logical expressions that were updated at said second point in time, said processing said service request message includes said gateway process denying access to said web service in response to receiving said service request message;
   receiving at said gateway process a request from said agent process for said one or more logical expressions that were updated at said second point in time in response to said gateway process denying access to said web service; and
   transmitting said one or more logical expressions that were updated at said second point in time to said one or more client computers to be cached on said one or more client computers in response to said request.

7. The method of claim 6, wherein said agent process generates said service request message for said web service at a third point in time subsequent to said second point in time.

8. The method of claim 6, wherein said agent process transmits said service request message for said web service to said gateway process at a third point in time subsequent to said second point in time.

9. The method of claim 6, wherein said transmitting said one or more logical expressions that were updated at said second point in time to said one or more client computers is performed by said gateway process.

10. The method of claim 6, wherein said one or more logical expressions include a rule set.

11. The method of claim 6, wherein said one or more logical expressions include an assertion.

12. The method of claim 6, wherein said one or more logical expressions include message rerouting information.

* * * * *